Patented June 10, 1952

2,599,803

UNITED STATES PATENT OFFICE 2,599,803

LUBRICATING COMPOSITION

Seaver Ames Ballard, Orinda, Rupert Clarke Morris, Berkeley, and John L. Van Winkle, San Lorenzo, Calif., assignors to Shell Development Company, San Francisco, Calif., a corporation of Delaware No Drawing. Application November 1, 1948, Serial No. 57,835

13 Claims. (Cl. 252—56)

This invention relates to improved lubricating materials and, more particularly, relates to improved organic compounds having superior lubricating characteristics and especially thermal stability properties.

Mineral oil lubricants, such as those made from paraffin-base or naphthenic-base petroleums are useful for most lubricating purposes when the conditions to which said lubricants are subjected are relatively mild. However, lubricants of petroleum origin are limited in their utility by certain inherent characteristics. For example, especially when employed for aviation purposes, a lubricant is often subjected to wide temperature variations, such as hot ground temperatures and the extremely cold temperatures encountered in the atmosphere, say, about 10–20,000 feet altitude. In these circumstances the ordinary mineral oil lubricants fail to function properly, either being too fluid when warm or too stiff when cold.

The tendency of mineral oils to oxidize rapidly, especially in the presence of certain metallic substances such as copper, iron oxide, etc., is well known. While the addition of anti-oxidants corrects this adverse feature to a limited extent, in many instances mineral oil lubricants are unsatisfactory, due to sludge and gum formation, both of which phenomena are results of oxidation reactions.

Certain non-hydrocarbon substances of synthetic origin have been used for specialized lubrication purposes. For example, polymeric alkylene oxides, such as polymerized propylene oxide, have been used for lubricating purposes. Other similar polymers have found restricted use as substitutes for mineral oil lubricants. Some of these have hydroxyl or alkoxyl end groups on one or both ends of the polymeric chain. These various liquid polymeric lubricants have one or more properties which make their substitution for mineral oil advantageous. For example, the viscosity indices of many of them are relatively high, in comparison with those of mineral oils, and for this reason operate over a comparatively wide temperature range. However, due to the free hydroxyls or loosely-bound terminal alkoxyl groups, the synthetic lubricants are usually unsatisfactory for many purposes, since they are unstable towards oxidizing influences, change their characteristics relatively rapidly during engine use, absorb water from the surrounding atmosphere, etc.

It is an object of this invention to provide improved synthetic lubricants. It is another object of this invention to provide a synthetic lubricant having improved resistance to oxidation. It is a third object of this invention to provide a process for preparing non-hydrocarbon lubricants having substantial resistance to water absorption. It is still another object of this invention to provide new lubricants which are thermally stable. Other objects will appear hereinafter.

Now, in accordance with this invention, it has been found that liquid esters and especially diesters of oxyalkylene linear polymers form unexpectedly superior lubricating compositions having high viscosity indices, low pour points, good thermal stability and high resistance to oxidizing influences.

Still in accordance with this invention, it has been found that polymers of this type having ester end groups of four or more carbon atoms may be improved by combination with a viscosity index improving agent of the polymerized unsaturated ester type. Again in accordance with this invention, it has been found possible to combine viscosity index improving agents with even lower esters of the oxyalkylene polymers by using as a solubilizing medium an oleaginous ester of a dicarboxylic acid having from 4 to 12 carbon atoms.

The polymeric lubricant

The preferred configuration of the subject lubricating polymers is as follows:

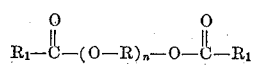

In the above configuration, $n$ is an integer of at least ten and preferably has a value between ten and thirty. The substituent R groups represent saturated alkylene radicals having from two to twenty carbon atoms, the $R_1$'s representing saturated aliphatic hydrocarbon radicals. The molecular weight of the group

should be a minimum of 400 and preferably from 400 to 1600. Due to the process by which these polymers are prepared, molecular weight determinations result in an average figure, since the polymerized products will always contain a range of polymers of varying molecular weights.

Polymers of the above configurations may be prepared by the esterification of alkylene oxide polymers. 1,2-propylene oxide is a preferred species of this type, but the alkylene oxides useful for this purpose are those having from two to twenty carbon atoms and may be either straight chained or branched chained alkylene oxides. Other suitable species of this type include, for example, 2,3-butylene oxide, isobutylene oxide and tetraethyl ethylene oxide, as well as their polymerizable homologs and analogs.

Copolymers of the alkylene oxides having the above configurations also are suitable for the present purpose. The copolymers of ethylene oxide and propylene oxide are especially suitable due to their favorable response to esterification and the resulting low temperature lubricating properties of the products.

Glycols may be employed as the polymerizable monomer for the production of the described polymeric lubricants. The unmodified esterified polymers of ethylene glycol, itself, do not ordinarily form satisfactory lubricants, since they are usually high molecular weight, wax-like solvents. The low molecular weight ethers of polyglycols are substantially unsuitable for lubricating purposes due to their low viscosity and consequent lack of lubricity at high operating temperatures. Esterification of the end groups of glycol polymers has been found, according to present invention, to result in the formation of highly satisfactory and stable lubricants. In addition to ethylene glycol, other suitable glycols include alkylene glycols having from two to twenty carbon atoms in which the glycolic hydroxyl groups are separated by from two to ten carbon atoms, such as ethylene glycol, trimethylene glycol, hexylene glycol and decamethylene glycol. The glycols are preferably straight chain materials but may be branched as well, as in the case of dibutylethylene glycol.

Copolymers of glycols are suitable for lubricating purposes when their hydroxyl end groups have been esterified. A typical copolymer suitable for the present purpose is that of a mixture of three parts trimethylene glycol with five parts ethylene glycol.

The process by which polymers of the described varieties are prepared is well known. The above types of monomers are usually polymerized at temperatures varying from about −25° C. to about 250° C., preferably in the range from about room temperature to about 150° C. Diluents may be used for controlling the reaction, such as water, alcohols, hydrocarbons, halogenated hydrocarbons, etc. Preferred catalysts include amines such as triethanol amine and basic catalysts such as sodium hydroxide as well as metallic oxides such as calcium oxide. Mineral acids such as sulfuric acid and various organic salts such as sodium acetate may be employed. Other favored catalysts are alkali metal phosphates, carbonates, sulfates and chlorides, as well as Friedel-Crafts catalysts, boron trifluoride, activated clays, peroxides and ultra-violet light.

In summary, the polymerization results in the formation of linear polymers having the configuration

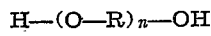

$$H-(O-R)_n-OH$$

wherein $n$ is an integer from ten to thirty, R is an alkylene hydrocarbon radical having two to twenty carbon atoms and the molecular weight of the polymer is from about 400 to about 1600. It is appreciated that polymers having higher and lower molecular weights may be obtained, but they are not suitable for lubricating purposes.

*Esterification of oxyalkylene polymers*

The esterification of the various polymers is usually effected with esterification agents such as organic acids, salts, anhydrides, cyanides and chlorides. Aliphatic monocarboxylic acids are a preferred class of esterification agent. Those found to be most suitable for the present purpose have from two to twenty carbon atoms and are exemplified by acetic acid, 2-ethylhexoic acid and the higher fatty acids such as stearic and oleic acids. The corresponding anhydrides and acid chlorides are also preferred esterifying agents. Naphthenic acids have been used for the preparation of suitable polymers, but the aliphatic monocarboxylic acids form a class having more favorable properties. Di-basic aliphatic acids may be employed, such as adipic acid. Mixtures of vegetable oil acids, such as those derived from tall oil, castor oil or linseed oil, may be utilized.

The esterified lubricants which comprise the basic lubricants of the present invention are formed by heating the acid, or acid derivative such as anhydride, chloride, etc., with the lubricant, usually in the presence of a catalyst or dehydrating agent. Catalysts useful in carrying out the esterification include zinc chloride, hydrogen chloride, concentrated sulfuric acid, p-toluene sulfonic acid, concentrated phosphoric acid, metallic oxides such as titanium oxide, etc.

The esterification may be carried out with or without a diluent being present. The diluent may be used merely to thin the mixture, especially if the lubricant is viscous. Again, it may be present as a solvent either for the catalyst, esterifying agent or polymer. The diluent is usually a liquid boiling at about the temperature at which the esterification is to be conducted. In such a case, the diluent serves not only as a partial or complete solvent for one or more of the reaction components, but acts as a temperature-controlling agent as well. The diluent preferably is an inert solvent such as a hydrocarbon, including the hexanes, octanes, dodecanes, etc., and their isomers. Mixture of diluents may be used.

The esterification usually is conducted at temperatures from about 50° C. to about 200° C. when an anhydride is used as the esterifying agent. When the acid chloride is employed, the esterification temperature will vary from about −10° C. to about 150° C. When the esterification agent contains a long chain, it may be relatively inactive and consequently requires prolonged reaction at elevated temperature with the lubricants in order to effect substantially complete esterification.

The time necessary to complete the esterification will depend upon the esterification agent, the identity of the lubricant, the identity of the catalyst and its ratio to the components, and the temperature at which the esterification is conducted. Usually, the esterification will require from 0.1 to 24 hours, preferably from 0.5 to 6 hours, since this latter preferred range of esterification time allows adequate chance to maintain control over the reaction. If the esterification is allowed to proceed too rapidly, the action may become violent and a certain amount of decomposition may occur, with the resultant loss of product and formation of color bodies.

Subsequent to esterification, the esterified lubricant is purified by the removal of catalysts, excess esterifying agents, solvents, water and color bodies. Catalysts and esterifying agents may be removed, for example, by extraction with selected solvents, such as water, dilute aqueous alkali, also by use of ion-exchange resins, fuller's earth, etc. Solvents may be flashed off or removed by extraction. Water may be removed with dehydrating agents or with heating under diminished pressure. The removal of color bodies may be effected with activated carbon, percolation through activated clays such as fuller's earth, mild oxidation, hydrogenation, etc. A preferred combination of decolorizing steps is percolation through an activated clay followed by hydrogenation.

One of the shortcomings of many non-mineral oil lubricants of the class described is high freezing points which they have prior to esterification. Conversely, one of the improvements made in esterification according to the present invention is the surprising and unpredictable lowering of the freezing point. Likewise, esterification greatly increases the viscosity index of the subject polymers. A specific example of the effect of esterifying a trimethylene glycol polymer with 2-ethylhexoic acid is given in Table 1 under Example I.

Another advantageous effect of esterifying the subject lubricants is the stability of the polymeric esters when used as engine lubricants. Many lubricants, both of mineral oil origin and from synthetic sources, increase in viscosity seriously due to polymerization occasioned by oxidation, engine heat and contact with catalysts such as iron, iron oxide, copper, etc. The esterified lubricants comprising the present invention show substantially no tendency to thicken during engine use, while at the same time, they maintain their other superior lubricating properties. The stability of an esterified polymer of trimethylene glycol, as compared with the unesterified lubricant, is demonstrated in Table 2, under Example II and in Table 4, under Example V.

Summarizing the preferred embodiments of the esterified polymers, the structures having the greatest utility for lubricating purposes are essentially as follows:

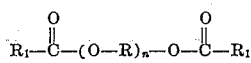

wherein $n$ is a figure from ten to thirty and each R is an alkylene radical having from two to ten carbon atoms, the $R_1$'s representing saturated aliphatic hydrocarbon radicals.

It has been found, in accordance with the present invention, that the subject esterified lubricants have greater oxidation stability and response to inhibitors than the corresponding unesterified lubricants. This phenomenon of improved inhibitor response is of prime importance. When, as in the case of polypropylene oxide, for example, it is necessary to employ large amounts of inhibitors in order to maintain adequate stability, certain inherent disadvantages accrue, such as the formation of lacquer or sludge on pistons and cylinder walls due in a large part to the inhibitor itself. Consequently, the unexpected high response of esterified polymers to certain anti-oxidants allows the preparation of stable non-petroleum lubricants which do not require unduly large amounts of inhibitors. Table 3, in Example III, demonstrates the superior response of esterified lubricants to an amine anti-oxidant.

The pour points of lubricating compositions is a property of major importance in determining their utility. It has been found, in accordance with this invention, that the pour points are unexpectedly depressed by esterification, thus increasing their utility considerably. This depression of pour point by esterification is surprising in view of the fact that etherification has relatively little effect on the pour point. For example, the methylation of polymerized trimethylene glycol caused only a drop of 5 degrees in the pour point. However, esterification of the subject lubricants causes a depression in pour points of about 35–55 degrees.

*Compositions with viscosity index improving agents*

It has been found that the lower esters of the above configuration are incompatible with viscosity index improvers, such as Acryloid, which are high molecular weight polymerized unsaturated esters. These agents include especially the polymerized esters of the acrylic acid series. It has been found, however, that if the ester end groups of the lubricants have at least six atoms, they are compatible with the viscosity index improvers. The latter are readily available as commercial products and comprise esters of acrylic acid and methacrylic acid having molecular weights from 5,000 to about 25,000, preferably 5,000 to 15,000. It will be understood that this is an average figure for the mixture of polymers which is always present. The acrylic acid is esterified with aliphatic alcohol or mixtures thereof having two to fifteen carbon atoms. They have been found to be compatible with the ester lubricants described above and are useful in amounts from about 1% to about 10% of the lubricating composition. It is possible to not only improve the viscosity index of the modified ester lubricant, but also to raise its viscosity in this manner.

A means has been discovered for solubilizing the Acryloid polymers with the lower esters of the polymeric lubricants. This comprises incorporating in the composition from 10% to 45% by weight thereof of an oleaginous ester of a dicarboxylic aliphatic acid. Suitable acids for this purpose are especially the glutarates, adipates, pimelates and sebacates, wherein the ester group is derived from an alcohol having from four to twelve carbon atoms. Especially favorable results are obtained if the alcohol has a branched aliphatic structure, and a preferred alcohol is 2-ethylhexanol. Another suitable alcohol is isobutyl alcohol. Preferred species of the esters are bis(2-ethylhexyl) sebacate and bis(2-methylheptyl) adipate. The resulting composition is as follows:

50–90% of an esterified oxyalkylene polymer as described above;
10–45% of an ester of a dicarboxylic aliphatic acid;
1–10% of a high molecular weight ester of an acrylic acid.

The lubricants or their compositions may be improved or modified by the presence of additional materials, such as anti-oxidants and grease-forming agents. Substituted phenols and aromatic amines, such as phenyl-alpha-naphthyl amine, are especially effective anti-oxidants. Alkali metal and alkali earth metal soaps of fatty acids and hydroxy such as calcium, lithium or sodium stearates or lithium 12-hydroxy stearate are effective grease-forming agents for the lubricants.

The following examples illustrate the present invention.

EXAMPLE I

*Preparation of 2-ethylhexoate of polytrimethylene glycol*

Seven hundred parts trimethylene glycol and 28 parts para-toluene sulfonic acid were heated in the presence of boiling decalin. At the end of 72 hours, the heating was discontinued. Four hundred fifty parts 2-ethylhexoic acid were added, together with 900 parts benzene, and the mixture was refluxed under a separating stillhead until no more water separation took place. The reaction mixture was heated for a short time with activated carbon, washed with dilute sodium hydroxide and with water, and the solvents and remaining moisture removed by heating at 100° C. under reduced pressure. The product was a clear red oil. Table 1 presents a comparison of properties of the polymer before and after esterification.

TABLE 1

|  | Unesterified Polymer | Esterified Polymer |
|---|---|---|
| Centistokes viscosity, (a) 100° F | 62.26 | 28.29 |
| Centistokes viscosity, (a) 210° F | 9.45 | 6.09 |
| Viscosity Index | 130 | 158 |
| Freezing point, ° C | +5 | (1) |

[1] Lower than −70.

EXAMPLE II

*Use of 2-ethylhexoate of a polytrimethylene glycol*

A polytrimethylene glycol was prepared and esterified as described in Example I. Samples of the polymer, both before and after esterification were tested by the Lausen Engine test, fully described by C. W. Georgi in J. Soc. Auto. Eng. 51, 52 (1943). The properties, both before and after the engine test, are compared in Table 2.

TABLE 2

|  | Unesterified Polymer | Esterified Polymer |
|---|---|---|
| Molecular weight before test | 452 | 785 |
| Molecular weight after test | 624 | 740 |
| Viscosity, centistokes (a) 100° F. before test | 59.6 | 69.3 |
| Viscosity, centistokes (a) 100° F. after test | 98.9 | 75.9 |
| Viscosity, centistokes (a) 210° F. before test | 9.88 | 12.62 |
| Viscosity, centistokes (a) 210° F. after test | 14.44 | 13.52 |
| Viscosity index, before test | 139 | 148 |
| Viscosity index, after test | 134 | 147 |

EXAMPLE III

*Oxidation stability of 2-ethylhexoate of polyethylene oxide*

A polymer of ethylene oxide was esterified with 2-ethylhexoic acid, substantially as described in Example I. Phenyl-alpha-naphthylamine (1%) was added to portions of the unesterified and esterified polymers. The 75 cc. samples were heated in an oxidation apparatus at 140° C., 50 lbs. per sq. in. initial oxygen pressure and 1 sq. cm. copper per g. polymer. Table 3 gives the relative stabilities of the polymers before and after esterification.

TABLE 3

|  | Unesterified Polymer | Esterified Polymer |
|---|---|---|
| Time required for 10 p. s. i. oxygen pressure drop, hours | 13.0 | 30.0 |
| Time required for 20 p. s. i. oxygen pressure drop, hours | 21.5 | 66.0 |
| Induction Period | 0.5 | 63.0 |

EXAMPLE IV

*Acetylation of a trimethylene glycol polymer*

Trimethylene glycol was polymerized substantially as described in Example I. The polymer was esterified by refluxing 1 mol of the polymer with 2 mols acetic anhydride in the presence of 2% para-toluene sulfonic acid and 2 volumes of benzene. The refluxing was continued under a still-head until no further separation of acetic acid occurred. After extracting the acetylation mixture four times with water, the solvent was flashed off and the acetylated polytrimethylene glycol was dried by heating at 100° C. under diminished pressure. The properties of the product are given in Table 4, below.

EXAMPLE V

*Engine lubrication with acetylated polymer of trimethylene glycol*

Lausen engine tests were conducted using in one instance an unesterified trimethylene glycol polymer as lubricant and in the second case, an acetylated trimethylene glycol lubricant. The relative stabilities of the two polymers under engine test conditions are shown in Table 4.

TABLE 4

|  | Unesterified Polymer | Esterified Polymer |
|---|---|---|
| Centistokes viscosity (a) 100° F. before test | 59.56 | 36.5 |
| Centistokes viscosity (a) 100° F. after test | 98.9 | 42.9 |
| Centistokes viscosity (a) 210° F. before test | 9.88 | 7.80 |
| Centistokes viscosity (a) 210° F. after test | 14.44 | 8.73 |
| Viscosity Index before test | 138 | 158 |
| Viscosity Index after test | 134 | 155 |

This application is a continuation-in-part of our copending application, Serial No. 694,419, filed August 31, 1946, now abandoned.

The invention claimed is:

1. A stable lubricating composition consisting essentially of a liquid diacetate of polytrimethylene glycol, said glycol having a molecular weight of from about 400 to about 1600.

2. A stable lubricating composition comprising as the major lubricating constituent thereof a liquid 2-ethylhexanoic acid diester of polyethylene glycol, said glycol having a molecular weight of from about 400 to about 1600, and 1–10% of a linear polymer of an acrylic acid ester selected from the group consisting of acrylic acid esters and methacrylic acid esters, having an average molecular weight within the range 5,000 to 25,000.

3. A stable lubricating composition comprising as the major lubricating constituent therof a liquid saturated fatty acid diester of polypropylene glycol, said glycol having a molecular weight of from about 400 to about 1600, and 1–10% of a linear polymer of an acrylic acid ester selected from the group consisting of acrylic acid esters and methacrylic acid esters, having an average molecular weight within the range 5,000 to 25,000.

4. A stable lubricating composition comprising as the major lubricating constituent thereof a liquid carboxylic acid diester of a polyalkylene glycol, said glycol having a molecular weight of from about 400 to about 1600 and the alkylene units thereof containing only three carbon atoms, and 1–10% of a linear polymer of an acrylic acid ester selected from the group consisting of acrylic acid esters and methacrylic acid esters, having an average molecular weight within the range 5,000 to 25,000.

5. A stable lubricating composition comprising as the major lubricating constituent thereof a liquid carboxylic acid diester of a linear homopolyalkylene glycol, the alkylene units of said glycol having 2 to 20 carbon atoms and the molecular weight of said glycol being from about 400 to about 1600, and 1–10% of a linear polymer of an acrylic acid ester selected from the group consisting of acrylic acid esters and methacrylic acid esters, having an average molecular weight within the range 5,000 to 25,000.

6. A stable lubricating composition comprising as the major lubricating constituent thereof a liquid carboxylic acid diester of a linear homopolyalkylene glycol, said glycol having a molecular weight of from about 400 to about 1600 and the alkylene units thereof containing only three carbon atoms, and 1–10% of a linear polymer of an acrylic acid ester selected from the group consisting of acrylic acid esters and methacrylic acid esters, having an average molecular weight within the range 5,000 to 25,000.

7. A stable lubricating composition comprising as the major lubricating constituent thereof a liquid di-2-ethylhexoate of polypropylene glycol, said glycol having a molecular weight of from about 400 to about 1600, and 1–10% of a linear polymer of an acrylic acid ester selected from the group consisting of acrylic acid esters and methacrylic acid esters, having an average molecular weight within the range 5,000 to 25,000.

8. A stable lubricating composition comprising as the major lubricating constituent thereof a liquid diester of a saturated fatty acid of 2 to 20 carbon atoms with a polytrimethylene glycol, said glycol having a molecular weight of from about 400 to about 1600, and 1–10% of a linear polymer of an acrylic acid ester selected from the group consisting of acrylic acid esters and methacrylic acid esters, having an average molecular weight within the range 5,000 to 25,000.

9. A stable lubricating composition comprising as the major lubricating constituent thereof a liquid saturated aliphatic acid diester of a polyalkylene glycol, the alkylene units of said glycol having from 2 to 20 carbon atoms, the molecular weight of said glycol being from about 400 to about 1600, and said acid containing from 2 to 20 carbon atoms; and 1–10% of a linear polymer of an acrylic acid ester selected from the group consisting of acrylic acid esters and methacrylic acid esters, having an average molecular weight within the range 5,000 to 25,000.

10. A stable lubricating composition comprising a liquid diester of a saturated fatty acid with a polyalkylene glycol, the alkylene radical of said glycol having from 2 to 20 carbon atoms and the molecular weight of said glycol being from about 400 to about 1600, and 1–10% of a linear polymer of an acrylic acid ester selected from the group consisting of acrylic acid esters and methacrylic acid esters, having an average molecular weight within the range 5,000 to 25,000.

11. A stable lubricating composition comprising as the major lubricating constituent thereof a liquid diester of a carboxylic acid with a polyalkylene glycol, the alkylene units of said glycol having from 2 to 20 carbon atoms and the molecular weight of said glycol being from about 400 to about 1600, and 1–10% of a linear polymer of an acrylic acid ester selected from the group consisting of acrylic acid esters and methacrylic acid esters, having an average molecular weight within the range 10,000 to 25,000.

12. A stable lubricating composition comprising 90–99%, by weight of a liquid diester of a carboxylic acid with a polyalkylene glycol, the alkylene units of said glycol having from 2 to 20 carbon atoms and the molecular weight of said glycol being from about 400 to about 1600, and 1–10% by weight of a linear polymer of methacrylic acid esters having an average molecular weight within the range 10,000 to 25,000.

13. A stable lubricating composition comprising 50–90% by weight of a liquid diester of a carboxylic acid with a polyalkylene glycol, the alkylene units of said glycol having from 2 to 20 carbon atoms and the molecular weight of said glycol being from about 400 to about 1600, 10–45% by weight of an ester of an aliphatic dicarboxylic acid having from 4 to 12 carbon atoms and 1–10% by weight of a linear polymer of methacrylic acid esters having a molecular weight within the range 10,000 to 25,000.

SEAVER AMES BALLARD.
RUPERT CLARKE MORRIS.
JOHN L. VAN WINKLE.

REFERENCES CITED

The following references are of record in the file of this patent:

UNITED STATES PATENTS

| Number | Name | Date |
|---|---|---|
| 1,970,578 | Schoeller et al. | Aug. 21, 1934 |
| 2,229,222 | Reid | Jan. 21, 1941 |
| 2,359,750 | Collins | Oct. 10, 1944 |
| 2,411,150 | Evans et al. | Nov. 19, 1946 |
| 2,417,281 | Wasson et al. | Mar. 11, 1947 |
| 2,448,567 | Zisman | Sept. 7, 1948 |
| 2,448,664 | Fife et al. | Sept. 7, 1948 |
| 2,457,139 | Fife et al. | Dec. 28, 1948 |
| 2,481,278 | Ballard et al. | Sept. 6, 1949 |
| 2,492,955 | Ballard et al. | Jan. 3, 1950 |